US008537670B2

(12) United States Patent
Sohn et al.

(10) Patent No.: US 8,537,670 B2
(45) Date of Patent: Sep. 17, 2013

(54) ROUTER CONGESTION CONTROL

(75) Inventors: Soonyong Sohn, Elkridge, MD (US); Brian L. Mark, Fairfax, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 283 days.

(21) Appl. No.: 12/881,739

(22) Filed: Sep. 14, 2010

(65) Prior Publication Data

US 2012/0063308 A1  Mar. 15, 2012

(51) Int. Cl.
*H04J 1/16* (2006.01)
*H04L 12/28* (2006.01)

(52) U.S. Cl.
USPC ............ 370/230; 370/235; 370/392; 370/412

(58) Field of Classification Search
USPC .................................. 370/230, 235, 392, 412
See application file for complete search history.

(56) References Cited

U.S. PATENT DOCUMENTS

| | | | |
|---|---|---|---|
| 5,276,677 A | 1/1994 | Ramamurthy et al. | |
| 5,737,313 A | 4/1998 | Kolarov et al. | |
| 2002/0110086 A1* | 8/2002 | Reches | 370/235 |
| 2003/0152083 A1* | 8/2003 | Nagata et al. | 370/395.4 |
| 2004/0085964 A1* | 5/2004 | Vaananen | 370/395.4 |
| 2006/0146708 A1* | 7/2006 | Kanazawa | 370/232 |
| 2007/0230492 A1* | 10/2007 | Ugai et al. | 370/412 |
| 2009/0080338 A1* | 3/2009 | Parker et al. | 370/250 |
| 2011/0286468 A1* | 11/2011 | Tomonaga et al. | 370/412 |
| 2011/0299392 A1* | 12/2011 | Lee et al. | 370/235 |

OTHER PUBLICATIONS

S. Mascolo, D. Cavendish, and M. Gerla, "ATM Rate Based Congestion Control Using a Smith Predictor," Performance Evaluation, Special Issue on Atm Traffic Control, vol. 31, Nov. 1997.
S. Mascolo, "Congestion Control in High-Speed Communication Networks Using the Smith Principle," Special Issue on Control Methods for Communication Networks, Dec. 1999.
S. Mascolo, "Smith's Principle for Congestion Control in High Speed Data Networks," IEEE Transactions on Automatic Control, Feb. 2000.
S. Mascolo, D. Cavenish, and M. Gerla, "ATM Rate Based Congestion Control Using a Smith Predictor: an EPRCA Implementation," in Proc. INFOCOM'96, vol. 2, pp. 569-576, Mar. 1996.
D. Cavendish, M. Gerla, and S. Mascolo, "A control theoretic approach to congestion control in packet networks," IEEE/ACM Transactions on Networking, vol. 12, pp. 893-906, Oct. 2004.
L. Benmohamed and S. M. Meerkov, "Feedback Control of Congestion in Packet Switching Networks: The Case of a Single Congested Node," IEEE/ACM Transactions on Networking, vol. 1, pp. 693-707, Dec. 1993.
L. Benmohamed and S. M. Meerkov, "Feedback Control of Congestion in Packet Switching Networks: The Case of a Multiple Congested Node," International Journal of Communications Systems, vol. 10, pp. 227-246, Sep. 1997.

(Continued)

*Primary Examiner* — Andrew Lee
(74) *Attorney, Agent, or Firm* — DLA Piper LLP (US)

(57) ABSTRACT

A router, implemented in hardware and/or hardware in combination with software for routing packets, so as to limit congestion. The router monitors incoming data flows as well as the queue length of its buffer to control the rate of incoming data flows via a flow controller. The flow controller uses at least one of: a Smith predictor, a proportional-integral controller, a proportional-derivative controller, and a proportional controller.

20 Claims, 12 Drawing Sheets

(56) References Cited

OTHER PUBLICATIONS

A. Kolarov and G. Ramamurthy, "A Control-Theoretic Approach to the Design of an Explicit Rate Controller for ABR Service," IEEE/ACM Transactions on Networking, vol. 7, pp. 741-753, Oct. 1999.

S. Sohn and B. Mark, "Rate-based Congestion Controller for Internet Routers," NAPL Technical Report, No.: TR-GMU-NAPL-Y10-N1, Jan. 5, 2010.

* cited by examiner (a) Rate (b) Queue Size

ROUTER CONGESTION CONTROL

DETAILED DESCRIPTION OF EMBODIMENTS

Embodiments of the present invention limit congestion in a router using a rate controller that computes a per-flow available rate for packet flows traversing an output port of the router.

Figure 1:
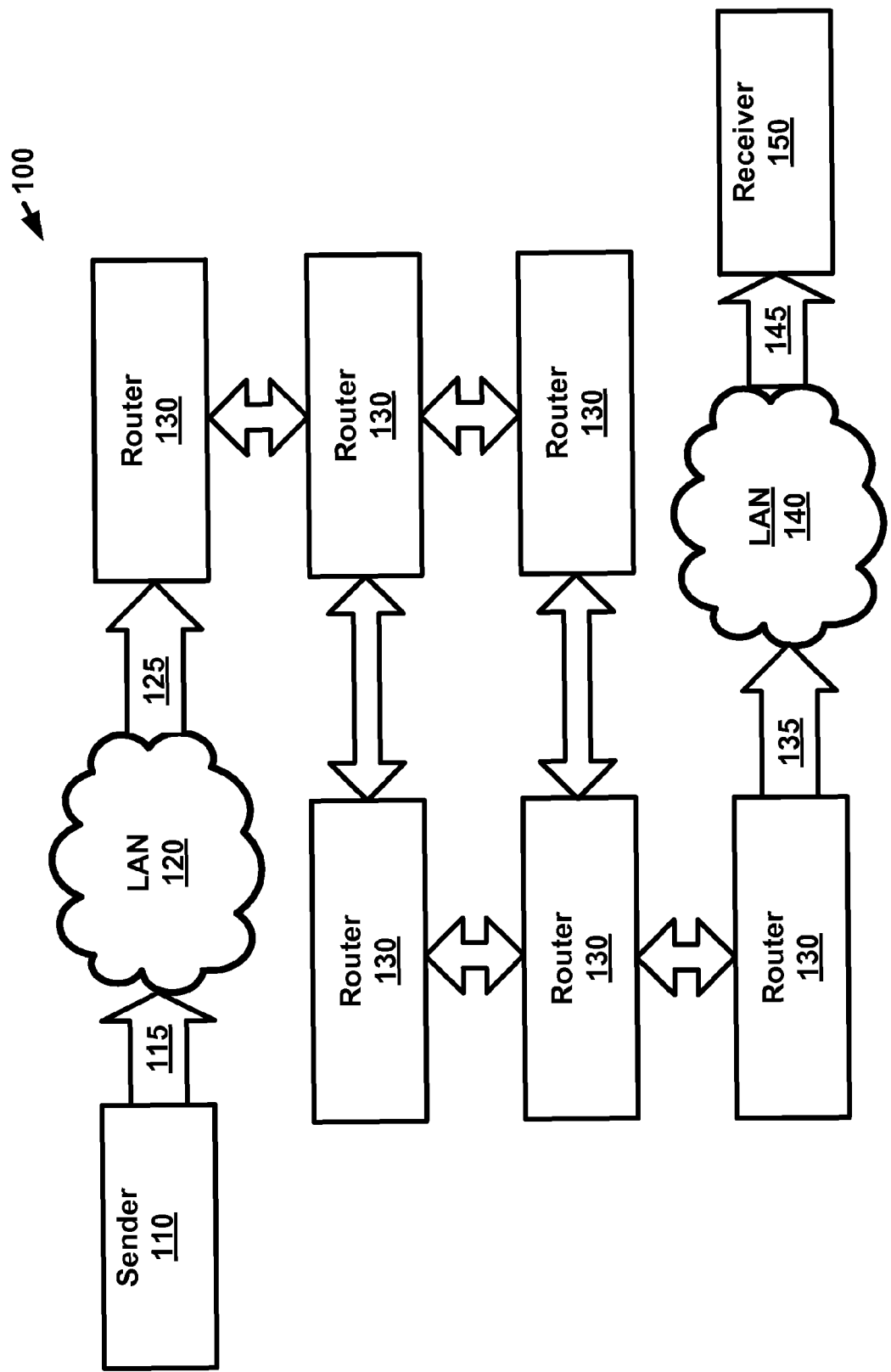
FIG. 1 is a system diagram of a network illustrating the path through which packets may flow from a sender to a receiver.

An overview of a network 100 is shown in FIG. 1. Network 100 may allow a sender 110 to send data packets to a receiver 150. Data packets from sender 110 may enter LAN (Local Area Network) 120 via connection 115. Connection 115 may be provided by, for example, a Network Interface Controller (NIC), Wireless Network Interface Controller (WNIC), or the like. Connection 115 may implement one or more physical network technologies, such as Ethernet, Token Ring, or optical fiber.

Within LAN 120, the data packets may pass through one or more hubs or switches. Because receiver 150 is not part of LAN 120, the data packets being sent from sender 110 may be routed outside of LAN 120, through an external network, such as the Internet, to reach receiver 150. Data packets may exit LAN 120 and enter the external network via connection 125. Connection 125 may be provided by a Wide Area Network (WAN) connection provided by an Internet Service Provider (ISP), private network, Virtual Private Network (VPN), or the like. Once on the external network, the data packets may be routed to receiver 150 via one or more routers 130. Data packets may traverse more than one router 130 in transit from a starting point to an end point. The data packets may be routed via one or more protocols, such as Transmission Control Protocol (TCP) over Internet Protocol (IP) also known as TCP/IP.

Upon reaching connection 135, which may be provided by another WAN connection, the data packets may be routed into LAN 140. Note that connection 125 and connection 135 do not need to be provided by the same network. Once in LAN 140, the packets may be routed to receiver 150 via connection 145.

Figure 2:
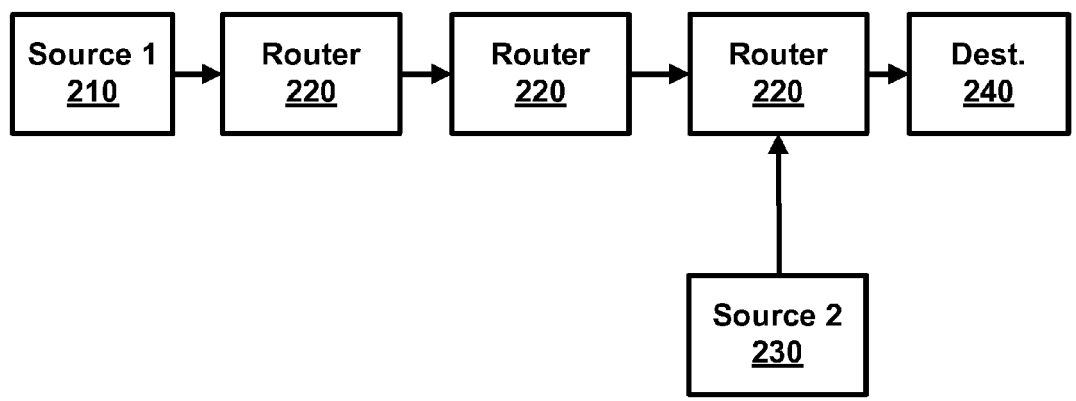
FIG. 2 is a system diagram of a network illustrating packet delay which may occur when a first source and a second source are placed at different distances from a destination.

The overview provided above was simplified in that it illustrated a single source of data packets (i.e., sender 110) sending to a single destination (i.e., receiver 150). FIG. 2 illustrates the issues that may occur when two sources are located at different distances from a single destination. Packets from source 1 210 may traverse through three routers 220 to reach destination 240. Meanwhile, data packets from source 2 230 may only have to travel through one router 220 to reach destination 240. Having to traverse multiple routers 220, as well as longer distances may result in a larger Round-Trip Time (RTT) for source 1 210 relative to source 2 230. RTT is the amount of time that it takes for the sender of a data packet to receive acknowledgement of receipt from the receiver. Most routers do not account for differences in RTT, which may lead to fairness issues.

In some instances, TCP/IP uses a congestion control strategy called Additive Increase Multiplicative Decrease (AIMD). In AIMD, essentially, every time that the destination acknowledges receipt of a data packet, a window size is increased by one; larger windows may equate to increased bandwidth and faster transmission speeds. However, if a packet is lost, the window size may be reduced by half. TCP/IP throughput is inversely proportional to RTT, which may lead to efficiency and fairness problems. Among multiple connections with different RTTs sharing a link (as shown in FIG. 2, source 1 210 could have a larger RTT than source 2 230), connections with shorter RTT could obtain more bandwidth resources.

Figure 3:
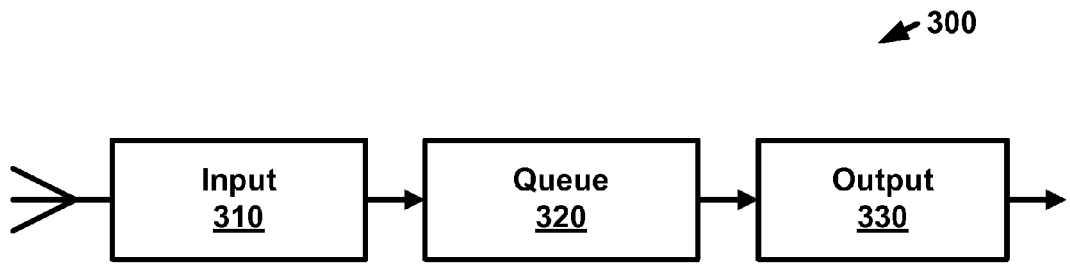
FIG. 3 is a system diagram of a simplified packet router as per an aspect of an embodiment of the present invention.

A router 300 as per an aspect of an embodiment of the present invention is illustrated in FIG. 3. Router 300 may include an input port 310, a queue 320 and an output port 330. Router 300 may receive data packets from one or more incoming data flows on input port 310. Those data packets may then be temporarily stored in queue 320. Queue 320, which may also be referred to as a buffer, may be provided by various temporary memories, such as, but not limited to Static Random Access Memory (SRAM), Dynamic Random Access Memory (DRAM), or the like. In some embodiments, the packets in queue 320 may also be duplicated in a permanent storage medium such as a hard drive or solid state disk. The data packets may then be routed through output port 330.

Figure 4:
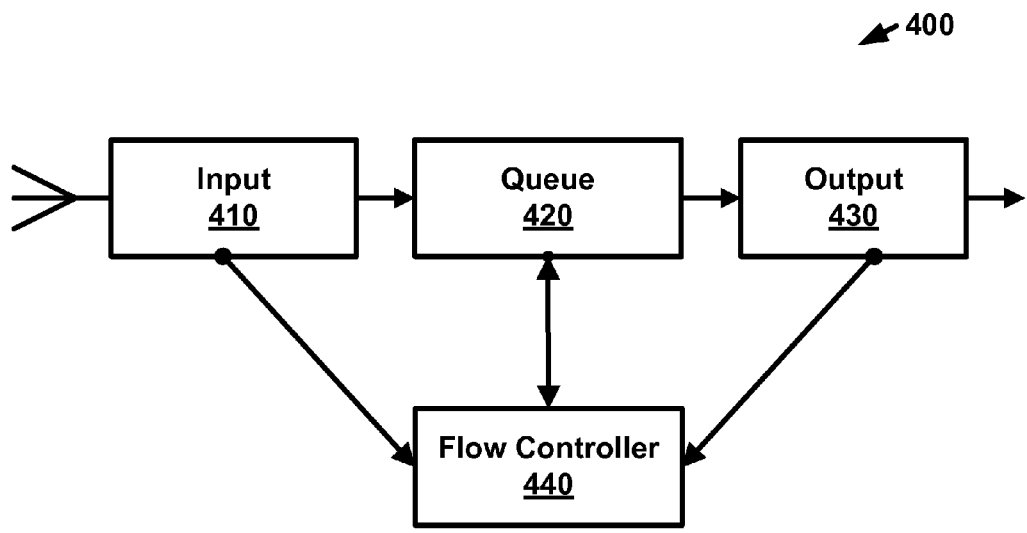
FIG. 4 is a system diagram of a packet router, which includes a flow controller, as per an aspect of an embodiment of the present invention.

A router 400, as per an aspect of an embodiment of the present invention is illustrated in FIG. 4. Like the router 300 illustrated in FIG. 3, router 400 may include an input port 410, a queue 420, and an output port 430. In addition, router 400 may include a flow controller 440 for controlling the sending rate of at least one of the incoming data flows to input port 410 in response to network status, such as, but not limited to network congestion or bottlenecks. For example, flow controller 440 may account for various traffic conditions such as light/heavy traffic on a link as well as propagation delay, i.e., RTT.

Figure 5:
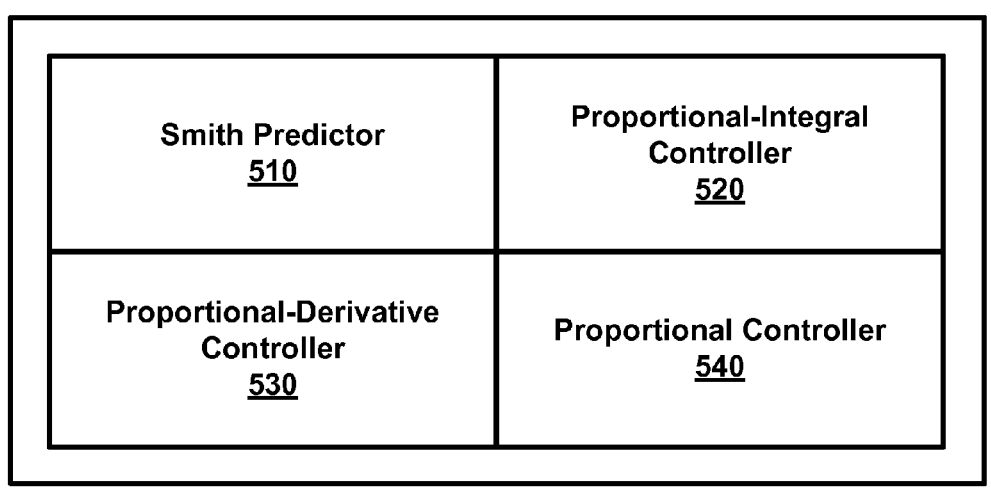
FIG. 5 is a system diagram of a flow controller as per an aspect of an embodiment of the present invention.

Flow controller 500, as per an aspect of an embodiment of the present invention as illustrated in FIG. 5, may include a Smith predictor 510. Flow controller 500 may achieve a zero queue deviation, and prevent buffer overflow and alleviate low utilization of the outgoing link communicatively coupled to an output port. It may then be possible for each of the plurality of incoming data flows to transmit data packets at an equal sending rate, thereby alleviating unfairness issues associated with differing RTTs in a TCP/IP environment. Smith predictor 510 may also act to eliminate RTT characteristics, thereby stabilizing performance. In addition, one or more for the following, a proportional-integral controller 520, proportional-derivative controller 530 and a proportional controller 540, may be added to stabilize flow controller 500.

Figure 6:
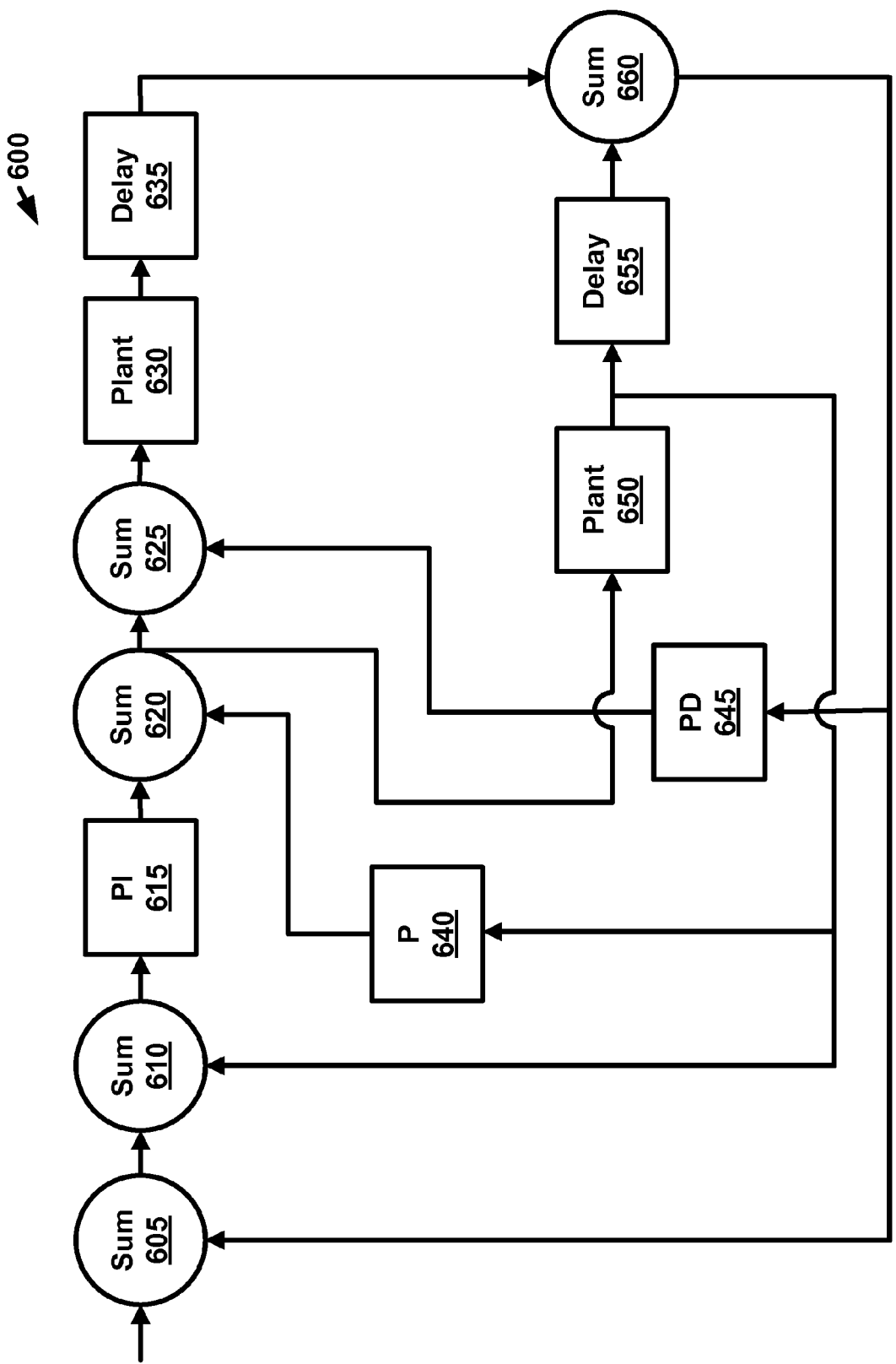
FIG. 6 is a system diagram of a flow controller as per an aspect of an embodiment of the present invention.

FIG. 6 illustrates flow controller 600, as per an aspect of an embodiment of the present invention. Flow controller may calculate a local flow rate value. The local flow rate may then be sent to a data sender and used to regulate the rate at which the sender sends data packets. The local flow rate value may be carried to the sender via a signaling channel or via a rate-based signaling protocol, or an in-band signaling protocol. "Rate-based signaling" communicates rate information between a source and a router. One may have a "rate-based signaling" protocol without it being "in-band"; e.g., the rate information may be carried in separate packets from the original flow.

In-band signaling may operate by appending the local flow rate value to the data portion of a packet (as opposed to the header portion). By doing so, in-band signaling may allow local flow rate values to pass through routers that are not capable of calculating or transmitting a low flow rate. This may allow incremental improvements in performance without requiring that every router in the network be equipped to do so. One example protocol that is both "in-band" and "rate-based" is TIA-1039. This protocol allows routers and other network equipment to insert a local flow rate value into the data portion of packets.

In accordance with TIA-1039, upon receiving the local flow rate value within a packet, the sender may adjust the rate at which it sends packets to avoid network congestion, based upon the local flow rate value. If each router through which the sender sends packets, modifies the local flow rate value, to be the lowest local flow rate amongst those routers, network congestion may be avoided.

Referring back to FIG. 6, flow controller 600 may include a Smith predictor. The Smith predictor may be included to compensate for delays that may be present in one or more of the data flows received on input 410. As shown, the Smith predictor comprises plant 630, delay 635, plant 650, delay 655 and sum 660. The combination of plant 630 and delay 635 may calculate an actual traffic value. The combination of plant 650 and delay 655 may calculate a modeled traffic value. The output of sum 660, i.e., the difference between the combination of plant 630 and delay 635 and the combination of plant 650 and delay 655, is the output of the Smith predictor. The output of plant 630 may be used as the local flow rate value and then used to control the transmission rate of a sender.

In addition to the Smith predictor, flow controller 600 may further include at least three additional controllers. PI 615, a proportional-integral controller may be provided to adjust rate coverage within an approximate desired rate. PI 615 may receive the output of sum 610 as an input. The output of sum 610 may be the difference between the output of sum 605 and the output of plant 650. The output of plant 650 may be referred to as the modeled local flow rate. The output of sum 605 may be the difference between an incoming flow rate and the output of sum 660, i.e., the output of the Smith predictor.

Flow controller 600 may further include PD 645, a proportional-derivative controller that may reject disturbances in at least one of the one or more incoming data flows on input 410.

PD 645 may receive the output of sum 660, i.e., the output of the Smith predictor as an input. The output of PD 645 may be input to sum 625. Sum 625 may also receive the output of sum 620 as an input. The output of sum 625 may be the difference between the output of sum 620 and the output of PD 645. The output of sum 625 may also be an input to plant 630.

Flow controller 600 may further include P 640, a proportional controller that may, in combination with PD 645, reduce at least one transient period of at least one of the one or more incoming data flows on input 410 and stabilize flow controller 600. P 640 may receive the output of plant as an input. Sum 620 may receive the output of P 640 as an input, along with the output of PI 615. The output of sum 620 may then be the difference between the output of P 640 and the output of PI 615. The output of sum 620 may be an input to both sum 625 and plant 650.

Flow controller 600, according to an embodiment of the present invention, was also modeled to test performance. The dynamics of queue 420, which receives one or more incoming flows with delay may be modeled as:

$$q[k+1] = Sat_Q\left\{q[k] + \sum_{i=1}^{N} r_i[k+1-d_i] - C\right\}$$

where $$Sat_a(z) = \begin{cases} 0, & z < 0 \\ a, & z > a \\ z, & \text{otherwise.} \end{cases}$$

Flow controller 600, according to an embodiment of the present invention, may utilize this equation and may be designed to find r[k+1] such that q[k+1] becomes the target length. Flow controller 600 may consider the utilization of the outgoing link in addition to queue dynamics, which may result in effectively servicing both light and heavy traffic conditions. For purpose of this discussion, without limitation, a heavy traffic condition exists when the incoming flows are greater than the capacity of the outgoing link. Light traffic conditions exist when the incoming flow are less than or equal to the outgoing link. To more effectively model both conditions, the equation given above may be modified as follows:

$$T[k+1] = Sat_{C+Q}\left\{q[k] + \sum_{i=1}^{N} r_i[k+1-d_i]\right\}$$

where T[k] is the total traffic that is requested to process at the outgoing link at time k and upper-bounded by C+Q. Flow controller 600, according to an embodiment of the present invention, may attempt to find r[k+1] that satisfies:

$$T[k+1] = C + q^0$$

where $q^0$ is the target queue length in flow controller 600, which may be set by the discretion of a network administrator. Based on the model described above, flow controller 600, according to an aspect of the present invention, may provide an efficient rate control mechanism that reduces queue overflow and low link utilization.

Figure 7:
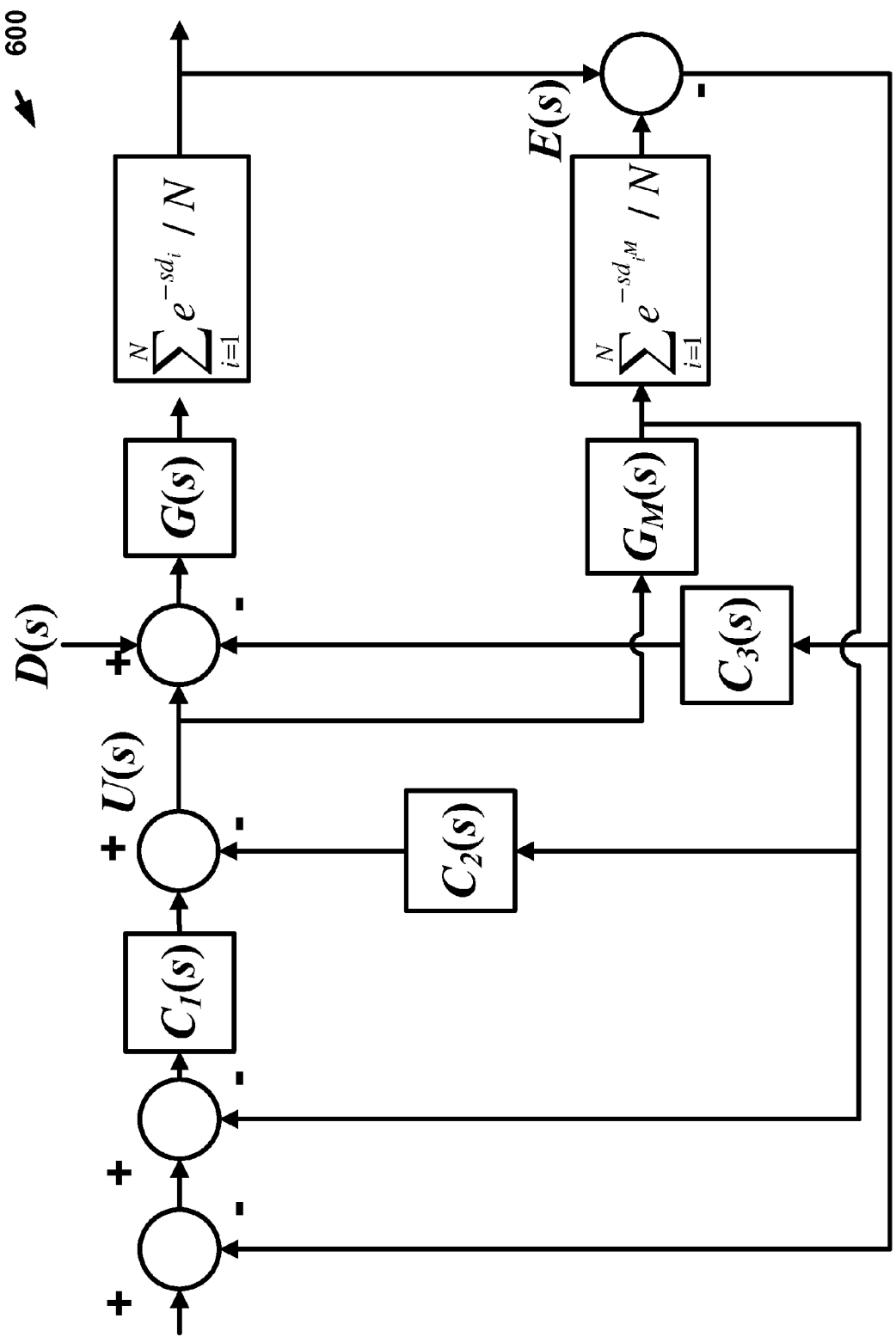
FIG. 7 is a system diagram of a flow controller as per an aspect of an embodiment of the present invention, that was used for simulating performance under various network conditions.

The model used to simulate flow controller 600, according to an aspect of the present invention, is shown in FIG. 7. M(s)

may model a measured volume of traffic an outgoing link. It may be described by theoretical processes G(s) and $$\sum_{i=1}^{N} e^{-d_i s}$$

to estimate the volume of traffic at the outgoing link as described by the following:

$$T[k+1] = Sat_{C+Q}\left\{q[k] + \sum_{i=1}^{N} r_i[k+1-d_i]\right\}$$

M(s) may be measured at the outgoing link directly then, and utilized as feedback so as to compute r[n+1] that may match to the targeted volume of traffic at the outgoing link. If the value is the same as the target volume of traffic, the feedback may be canceled by E(s) which is the volume of traffic modeled by a Smith predictor. Delay information may increase the precision to which E(s) is able to model the volume of traffic. This delay information may be carried by an in-band signaling protocol or a rate-based signaling protocol.

D(s) may be used to model the disturbance caused by the bottleneck link. Even if one router in a chain of routers defines a high rate of flow, another router with a bottleneck may define a lower flow rate. Consequently, the present router may take the flow with the smaller flow rate after a RTT, which may reduce the accuracy of rate computation. Thus, D(s) models the difference between these rates as disturbance on the computing of rate. Howevers, in a practical application, is it not possible to measure D(s), but it is included in the model to show that flow controller 600, according to an aspect of the present invention, is able to reject the negative influence caused by disturbance.

In addition to D(s), three additional controllers may be added: $C_1(s)$, $C_2(s)$, and $C_3(s)$. $C_1(s)$ may be provided to regulate feedback error, $C_2(s)$ may be provided to stabilize the integrating process of G(s), and $C_3(s)$ may be provided to reject disturbances D(s). The model used to model flow controller 600 according to an aspect of the present invention introduced multiple delays because multiple flows are modeled as coming into the router. Thus, it is important to model a process of $G_M(s)$ and a multiple delays process $$\sum_{i=1}^{N} e^{-d_i^M s}$$

in order to minimize any potential error between M(s) and E(s) where M(s) is the traffic measured at the outgoing link and E(s) is the one estimated by the model of $G_M(s)$ and $$\sum_{i=1}^{N} e^{-d_i^M s}.$$

Under the assumption that the model parameters are exactly matched to the process, the set point (so called reference or target) and disturbance responses may be given by:

$$M(s) = T_R(s)R(s) + T_D(s)D(s)$$

where $$T_R(s) = \frac{G_M(s)C_1(s)}{1 + G_M(s)(C_1(s) + C_2(s))} \sum_{i=1}^{N} e^{-d_i^M s}/N,$$

$$T_D(s) =$$

$$\frac{G_M(s)\left[1 + G_M(s)\left(C_1(s) + C_2(s) - C_1(s)\sum_{i=1}^{N} e^{-d_i^M s}/N\right)\right]}{[1 + G_M(s)(C_1(s) + C_2(s))]\left[1 + C_3 G_M(s)\sum_{i=1}^{N} e^{-d_i^M s}/N\right]} \sum_{i=1}^{N} e^{-d_i^M s}/N$$

The transfer function for the set point response in $T_R(s)$ shows that the set point response may only be affected by the parameters of controllers $C_1(s)$ and $C_2(s)$. Those parameters may be obtained utilizing a model of the delay-free part of the process. The transfer function of the disturbances response in $T_D(s)$ describes that the controller $C_3(s)$ influences the disturbance response but, may not affect the set point response.

The controllers of $G_1(s)$ and $G_2(s)$, and a load disturbance rejection controller $G_3(s)$ may have independent responsibility for the performance of flow controller 600. Thus, the set point and disturbance responses may be decoupled, which is an advantage of flow controller 600. That is, both the set point and load disturbance response may be independently optimized. Flow controller 600, according to an aspect of the present invention, may include an integrating process which may disrupt the stability of flow controller 600 when load disturbance is present. The integrating process with multiple dead-times (i.e., time delay) may be given by:

$$P(s) = G(s)\sum_{i=1}^{N} e^{-d_i s}/N = \frac{1}{s}\sum_{i=1}^{N} e^{-d_i s}/N$$

where N is the number of flows, $d_i$ is the dead time of flow i, and G(s) is the delay free part of the process P(s). The process of $G_M(s)$ is set to be identical to G(s). Thus, it may be described as:

$$G_M(s) = G(s) = \frac{1}{s}$$

Controllers $C_1(s)$, $C_2(s)$, and $C_3(s)$ may be a Proportional and Integral (PI) controller, a Proportional (P) controller, and a Proportional and Derivative (PD) controller respectively. They may be described as:

$$C_1(s) = K_P + \frac{K_I}{s} = K_P(1 + 1/sT_I)$$

$$C_2(s) = K_Q$$

$$C_3(s) = K_R + sK_D = K_P(1 + sT_D)$$

where $K_P$, $K_Q$, and $K_R$ may be the proportional parameters in each controller used to control system response time, $K_I$ is the integral parameter in $C_1(s)$ that enables the elimination of steady-state error, and $K_D$ is the derivative parameter in $C_3(s)$ that helps fast convergence to steady-state. By substitution, the set point transfer function may be given by:

$$T_R(s) = \frac{(K_P s + K_I)}{s^2 + (K_P + K_Q)s + K_I} \sum_{i=1}^{N} e^{-d_i^M s} / N,$$

$$= \frac{K_P(T_I s + 1)}{T_I s^2 + (K_P + K_Q)T_I s + K_P} \sum_{i=1}^{N} e^{-d_i^M s} / N.$$

The load disturbance function may be provided by:

$$T_D(s) = \frac{s^2 + (K_P + K_Q)s + K_I - (K_P s + K_I) \sum_{i=1}^{N} e^{-d_i^M s}/N}{(s^2 + (K_P + K_Q)s + K_I)\left(s + (K_R + K_D s)\sum_{i=1}^{N} e^{-d_i^M s}/N\right)}$$

$$\times \sum_{i=1}^{N} e^{-d_i^M s}/N,$$

$$= \frac{s^2 + (K_P + K_Q)s + K_P/T_I - K_P(s + 1/T_I)\sum_{i=1}^{N} e^{-d_i^M s}/N}{(s^2 + (K_P + K_Q)s + K_P/T_I)\left(s + K_R(1 + sT_D)\sum_{i=1}^{N} e^{-d_i^M s}/N\right)}$$

$$\times \sum_{i=1}^{N} e^{-d_i^M s}/N.$$

However, for the load disturbance, even if the process is an integrator, the following relation is always true:

$$\lim_{t \to \infty} d(t) = d$$

Thus the signal d(t) is an estimate of the constant input load disturbance d. However, it may be assumed that it is impossible to measure d.

To measure the stability of flow controller 600 according to an aspect of the present invention, Laplace transform methods may be utilized. In order to ensure the stability of the controller, the controller should substantially guarantee that the output of traffic is always equal to the target rate at steady-state, which may be given by:

$$m(t) = C + q^0$$

where m(t) is the time domain form of M(s). Under the condition given above, the stability of flow controller 600 suggests that the output should be less than or equal to the target rate as follows:

$$m(t) \leq q_0 \text{ for } t > 0$$

where $q_0$ is the bottleneck queue capacity, which may guarantee that this queue is always bounded (i.e., no packet loss). This condition provides the upper bound for the queue occupancy but does not guarantee the steady-state error free condition. Flow controller 600 may guarantee the steady-state error free condition by rejecting load disturbance using the PD controller of $C_3(s)$. Flow controller 600, according to an aspect of the present invention, may be analyzed in terms of the set point and disturbance responses at steady-state. The Laplace transform of m(t) may be given as follows:

$$M(s) = T_R(s)R(s) + T_D(s)D(s) = M_R(s) + M_D(s)$$

where m(t) transformed to the time domain may be given by:

$$m(t) = t_r(t)r(t) + t_d(t)d(t) = m_r(t) + m_d(t)$$

The set point response may be analyzed by the following:

$$T_R(s) = \frac{(K_P s + K_I)}{s^2 + (K_P + K_Q)s + K_I} \sum_{i=1}^{N} e^{-d_i^M s} / N$$

The set point response at steady-state may be given by:

$$\lim_{s \to 0} T_R(s) = 1$$

and so $m_r(t)$ may be given as:

$$m_r(t) = C + q^0$$

The load disturbance response at steady-state may be analyzed in the set point response. In this analysis, the load disturbance may be rejected by flow controller 600 according to an aspect of the present invention. The load disturbance response $T_D(S)$ may be modeled as:

$$T_D(s) = \frac{s^2 + (K_P + K_Q)s + K_I - (K_P s + K_I)\sum_{i=1}^{N} e^{-d_i^M s}/N}{(s^2 + (K_P + K_Q)s + K_I)\left(s + (K_R + K_D s)\sum_{i=1}^{N} e^{-d_i^M s}/N\right)} \sum_{i=1}^{N} e^{-d_i^M s}/N$$

The load disturbance at steady-state may be given by:

$$\lim_{s \to 0} T_D(s) = 0$$

And so, the load disturbance at time domain, $m_d(t)$ becomes $$m_d(t) = 0$$

Flow controller 600, according to an aspect of the present invention, rejects the load disturbance which is not modeled so that it is possible to stabilize flow controller 600 and so:

$$m(t) = m_r(t) + m_d(t) = C + q^0$$

which demonstrates that flow controller 600, according to an aspect of the present invention, may match the output of traffic to the set point (i.e., targeted traffic) at steady-state. Thus, it is shown that the proposed controller may substantially eliminate the steady-state error that happens to flow controller 600 which may include the integrator process when the load disturbance is introduced.

The transient response of flow controller 600, according to an aspect of the present invention, may be analyzed in order to obtain optimal parameters for controllers $C_1(s)$, $C_2(s)$, and $C_3(s)$. These parameters may determine the behavior of the transient response in flow controller 600, i.e., they may increase system response and quick convergence to steady-state, and eliminate the error (i.e., mismatching the output traffic to the set point). The parameters for controllers $C_1(s)$ and $C_2(s)$ may be determined using a model of the delay-free part of the plant, which is the beneficial feature of flow controller 600. The delay-free part of the transfer function $T_R(s)$ may be given as:

$$T_{RF}(s) = \frac{(K_P s + K_I)}{s^2 + (K_P + K_Q)s + K_I}$$

The transfer function $T_{RF}(s)$ is a second-order system which may be modeled in one of the following general forms:

$$T(s) = \frac{\omega_n^2}{s^2 + 2\xi_n s + \omega_n^2}$$

$$T(s) = \frac{\omega_n s/\alpha\xi + \omega_n^2}{s^2 + 2\xi\omega_n s + \omega_n^2}$$

where the parameter $\xi$ is the damping ratio that may control the rate oscillation and the parameter $\omega_n$ is the undamped natural frequency that helps to control the response time of flow controller 600. Each of the forms shown above demonstrates different types of the system response according to the poles of the system (i.e., real and unequal, real and equal, complex, or purely imaginary). However, only the response of stable systems whose poles have negative real parts will be considered. Flow controller 600, according to an aspect of the present invention, has its zero set at $S=-\alpha\xi\omega_n$. The parameter $\alpha$ controls the rate of rise (i.e., the system response time) or decay of the system response, i.e., the parameter $\alpha$ controls the damping of the system, which is called the damping factor. If the parameter $\alpha$ is too large, the zero is placed far to the left of the poles. Thus, the zero may have little effect on the system response because the coefficient on the s term is relatively small. The zero may have little effect on flow controller 600 if $\alpha$ is larger than 3, but as $\alpha$ decreases below 3, it has an increasing effect, especially as it decreases below 1. Thus, according to one aspect of the present invention, $\alpha$ may be set to 3 for flow controller 600. Doing so enables a fast system response. However, when the parameter $\xi$ is set to approximately 1, the oscillation is substantially eliminated and flow controller 600 is said to be critically damped: $\alpha=\xi\omega_n$.

In some instances, when the parameter $\xi$ is less than 1, flow controller 600 may become under-dampened; and, over-dampened when the parameter $\xi$ is greater than 1. Accordingly, by choosing $\alpha=3$ and $\xi=1$ the second-order system is given by:

$$\omega_n^2 = K_I$$

$$2\omega_n = K_P + K_Q$$

$$\frac{\omega_n}{3} = K_P$$

Large values of $K_P$ may increase the initial control effort, therefore, in some embodiments, $K_P$ may be constrained to unity, and so:

$$K_I = 9K_P^2$$

$$K_Q = 5K_P$$

The parameters of controller $C_3(s)$ may be determined using a model of the delay-free part of the plant as seen in the other controllers. The delay-free part of the transfer function $T_D(s)$ may be given by:

$$T_{DF}(s) = \frac{s^2 + (K_P + K_Q)s + K_P/T_I - K_P(s + 1/T_I)\sum_{i=1}^{N} e^{-d_i^M s}/N}{(s^2 + (K_P + K_Q)s + K_P/T_I)\left(s + K_R(1 + sT_D)\sum_{i=1}^{N} e^{-d_i^M s}/N\right)}$$

The stability of $C_3(s)$ depends on the roots of its characteristic equation:

$$(s^2 + (K_P + K_Q)s + K_P/T_I)\left(s + K_R(1 + sT_D)\sum_{i=1}^{N} e^{-d_i^M s}/N\right) = 0$$

Note that having obtained the control parameters, the characteristic equation becomes:

$$1 + F(s) = 0$$

where, $$F(s) = \frac{K_R(1 + sT_D)}{s} \sum_{i=1}^{N} e^{-d_i^M s}/N$$

This form of the characteristic equation may be used to analyze the optimal parameters of $C_3(s)$. The parameter $\Phi_{PM}$ which is the phase margin. The phase margin affects potential oscillations in flow controller 600. The phase margin may be given by:

$$\Phi_{PM} = \pi + \arg\{F(jw_1)\}$$

$F(jw_1)$ is constrained as:

$$|F(jw_1)| = 1$$

By setting $T_d$ to be proportional to the rate sampling interval $\tau_s$, which is given by:

$$T_d = \alpha\tau_s, 0 \leq \alpha \leq 1$$

And so:

$$w_1 = \frac{\pi/2 - \Phi_{PM}}{(1-\alpha)\tau_s}, \quad 0 < \Phi_{PM} < \pi/2$$

$$w_1 = \frac{K_R}{\sqrt{1 - (K_R \tau_s)^2}}, \quad 0 \leq K_R \tau_s < 1$$

$$K_R = \frac{\pi/2 - \Phi_{PM}}{\tau_s \sqrt{(1-\alpha)^2 + (\pi/2 - \Phi_{PM})^2 \alpha^2}}$$

For flow controller 600, according to an aspect of the present invention, the values for $\alpha$ and $\Phi_{PM}$ may be 0.4 and 64°, respectively. The parameter values identified above allow simulation to verify the transient response of flow controller 600.

One of the goals of flow controller 600, according to an aspect of the present invention, is to find a rate such that traffic at outgoing link matches to the target traffic. The derivative of traffic U(s) as illustrated in FIG. 7, may be utilized to find the rate, which may be given by:

$$U(s) = \frac{C_1(s)(R(s) - M(s) + E(s))}{1 + (C_1(s) + C_2(s))G_M(s)}$$

By inverse-transforming U(s) to the time domain:

$$u[n] = K_P y[n-1] + K_I \sum_{i=x}^{n-1} y[i] - K_Q \int_{t-\tau_s}^{t} u(\tau) d\tau$$

where $$y[n-1] = C + q^0 - (m[n-1] - e[n-1]) - \int_{t-\tau_s}^{t} u(\tau) d\tau$$

x is the discrete time at which the system output may become oscillatory, m[−1] and e[n−1] are the measured traffic at the outgoing link and the estimated traffic by Smith predictor, respectively, and $$\int_{t-\tau_s}^{t} u(\tau) d\tau$$

is the traffic estimated by the Smith predictor without delays.

Based on u(t), the new rate is described in discrete time as:

$$r[n+1] = r[n] + u[n]/N$$

which may be used to compute the rate that may control network congestion.

Figure 8:
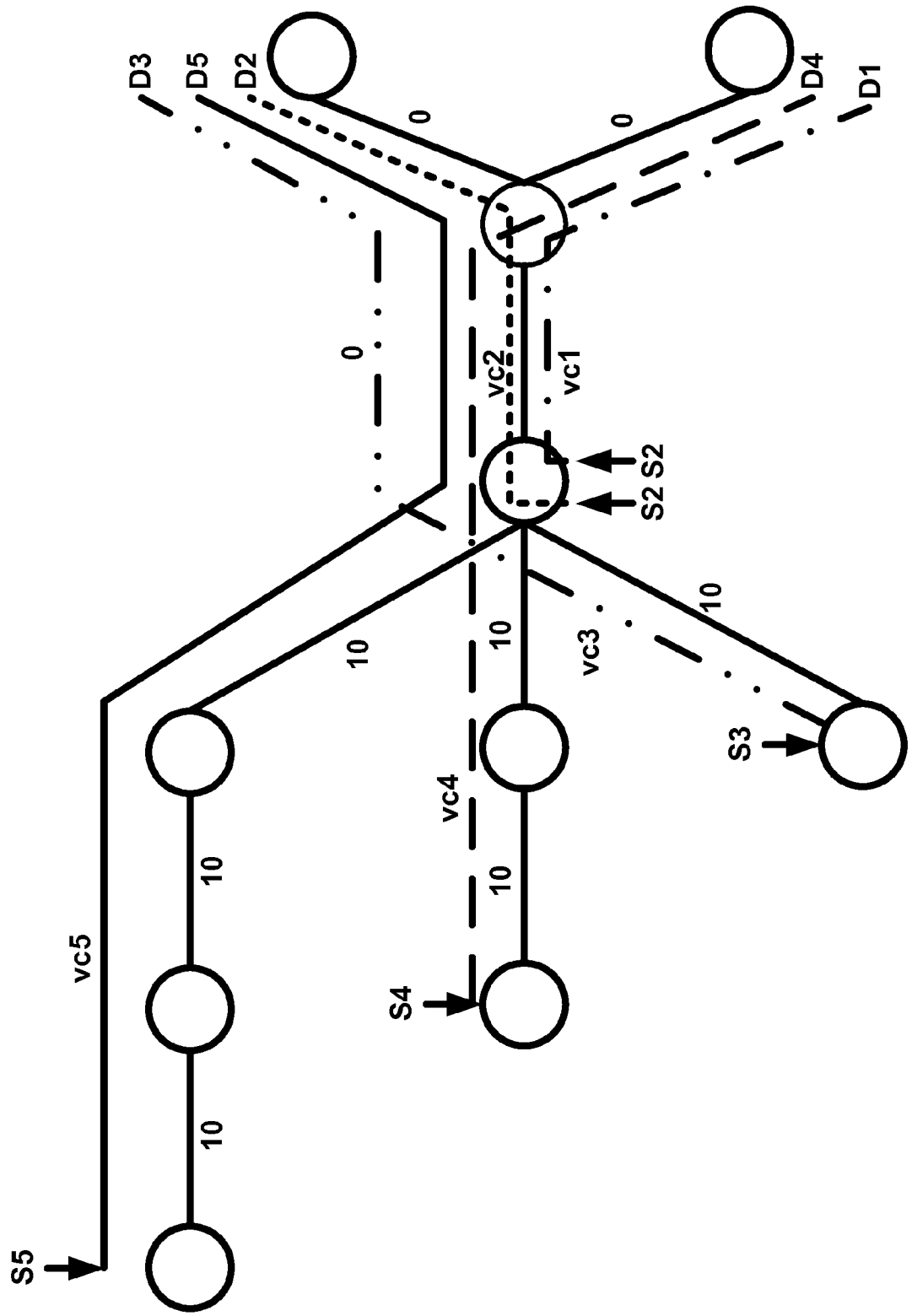
FIG. 8 is a system diagram of a network used to simulate the performance of a flow controller as per an aspect of an embodiment of the present invention.

The results of the simulation of flow controller 600 according to an aspect of the present invention, are compared with other controllers, which are Benmohamed's controller and Mascolo and Cavendish's controller. The simulations were carried out using the NS-2 network simulation platform, which is a discrete event simulator. The network topology used for simulation is shown in FIG. 8. This would be a clear way to compare the performance of flow controller 600, according to an aspect of the present invention, with that of other controllers. The topology used consists of 10 different nodes and 9 different links. Every link has identical properties such that every link has the capacity of 45 Mbps and the propagation delay of 2 ms, and every link is considered bi-directional.

The traffic generations used for the simulation were designed to cause congestion on the network, especially at the link between nodes A and B. Source node(s) may generate traffic using a transport protocol that carries rate and RTT (round-trip time) information in the packet header at regular in-band signaling intervals, e.g., once every 128 packets. The RTT information carried in the packet header may be used in the Smith predictor part of the flow controller 600 in the router. The router may update the rate information carried in the header of a packet traveling on the forward path from the source to the destination. The destination node extracts the rate information and forwards it in the header of a packet traveling in the reverse path from destination to source. The TIA-1039 signaling protocol provides a means to carry the rate and RTT information to and from the router. R-UDT (Rate-based UDT) is a modification of the UDT (UDP-based Data Transfer) transport protocol that essentially implements the standard TIA-1039 signaling protocol, i.e., it allows rate information to be signaled between the source and the router, with the additional feature of supplying RTT information from the source node to the router. Flows 1, 2, and 5 are destined for the upper node on the rightmost in FIG. 8 while other flows are for the lower node. Thus, five different flows are competing with each other to obtain the bandwidth in the bottleneck for the lower nodes. Flows are generated according to the predefined schedule in the table below:

|  | Connection | | | | |
|---|---|---|---|---|---|
|  | 1 | 2 | 3 | 4 | 5 |
| Start Time | 0 | 200 | 50 | 350 | 500 |
| End Time | 700 | 1000 | 850 | 1000 | 1000 |

The target buffer size is set to 30 packets (i.e., 45 Kbytes). The rate sampling interval is set to 30 ms at node A which is identical to the inband signaling interval of R-UDT. Simulations were implemented for two different situations: 1) small RTT, and 2) large RTT. For the small RTT scenario, link A and B have a propagation delay of 2 ms as for the other links. The largest RTT between source and destination in the network is less than the rate sampling interval. The large RTT scenario sets the propagation delay of link A and B to be 30 ms which makes the largest RTT greater than the rate sampling interval, and the propagation delay for the other links remains 2 ms.

Figure 9:
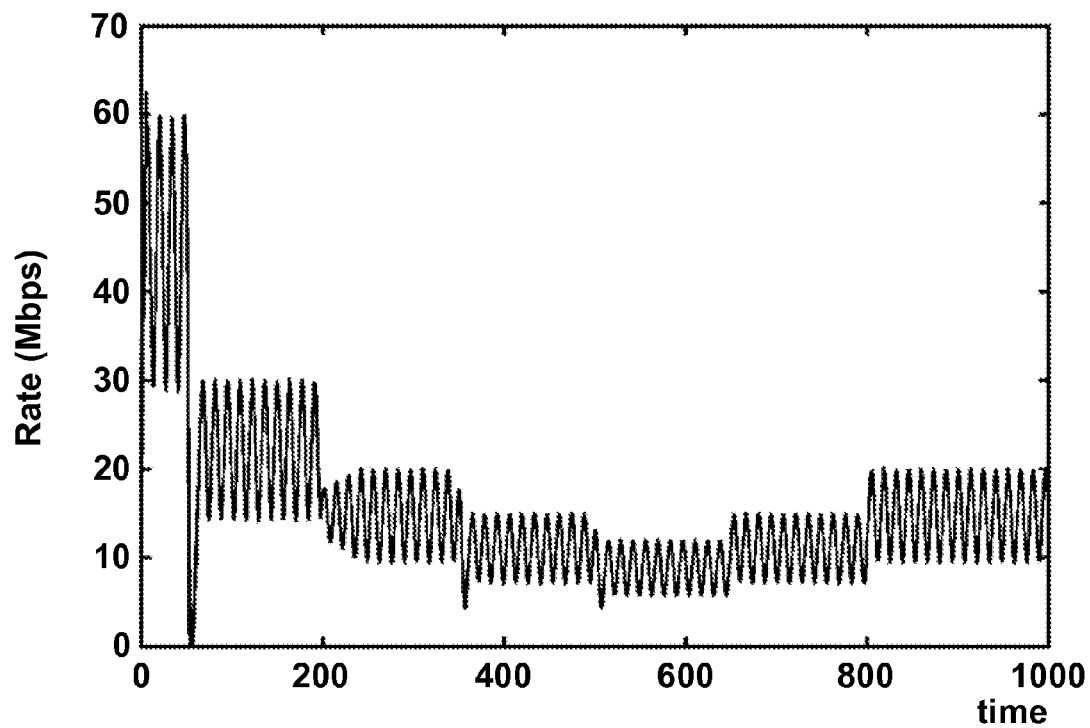
FIG. 9 is a chart describing the performance of a flow controller.
Figure 9:
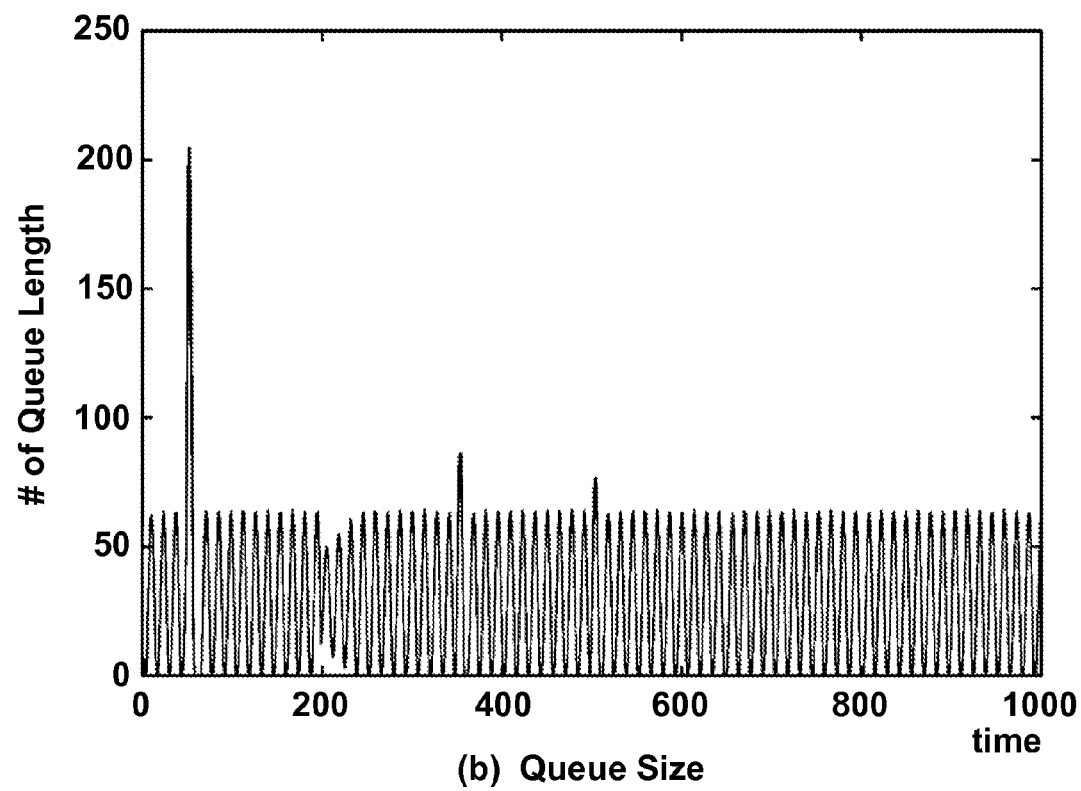

FIG. 9 illustrates the Benmohamed controller in terms of the rate and queue length of the small RTT case. The rate is fluctuating over time and does not converge into the desired rate. The queue length does not converge into the target length of 30 packets. Moreover, it shows the large size of queue occupancy whenever new flows are introduced. Even, both rate and queue length are fluctuating over time in steady-state.

Figure 10:
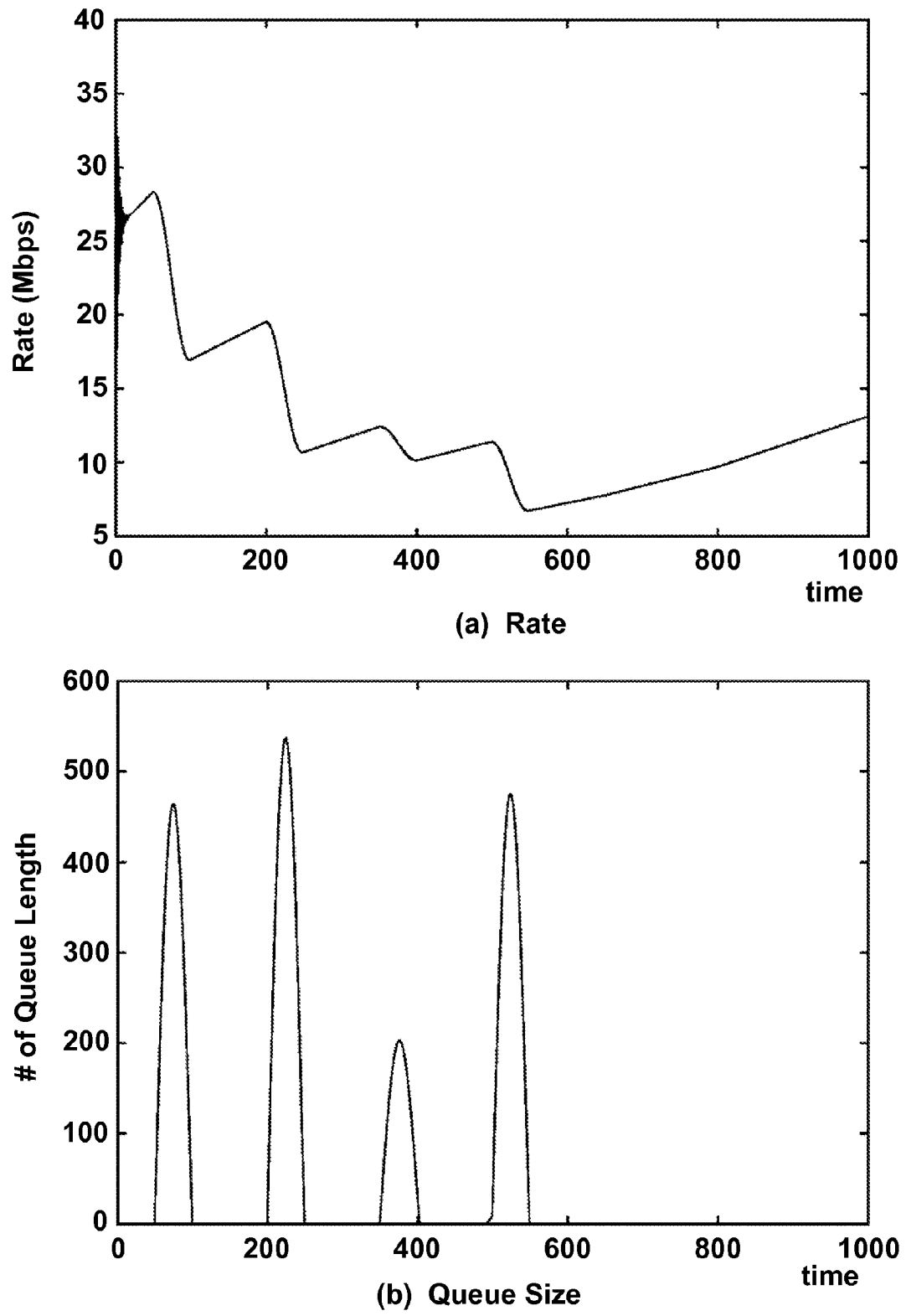
FIG. 10 is a chart describing the performance of a flow controller.

The large RTT situation for the Benmohamed controller is illustrated in FIG. 10. The rate slowly changes over time and the queue length changes drastically. None of them shows a reliable performance in large RTT. Benmohamed's controller assumes that every packet may carry the signal information in its header so rate feedback is updated within a single RTT on the sender side, however, R-UDT delivers the signal information every 128 packets so sending rate may be updated much slower than the assumption made in the Benmohamed controller.

Figure 11:
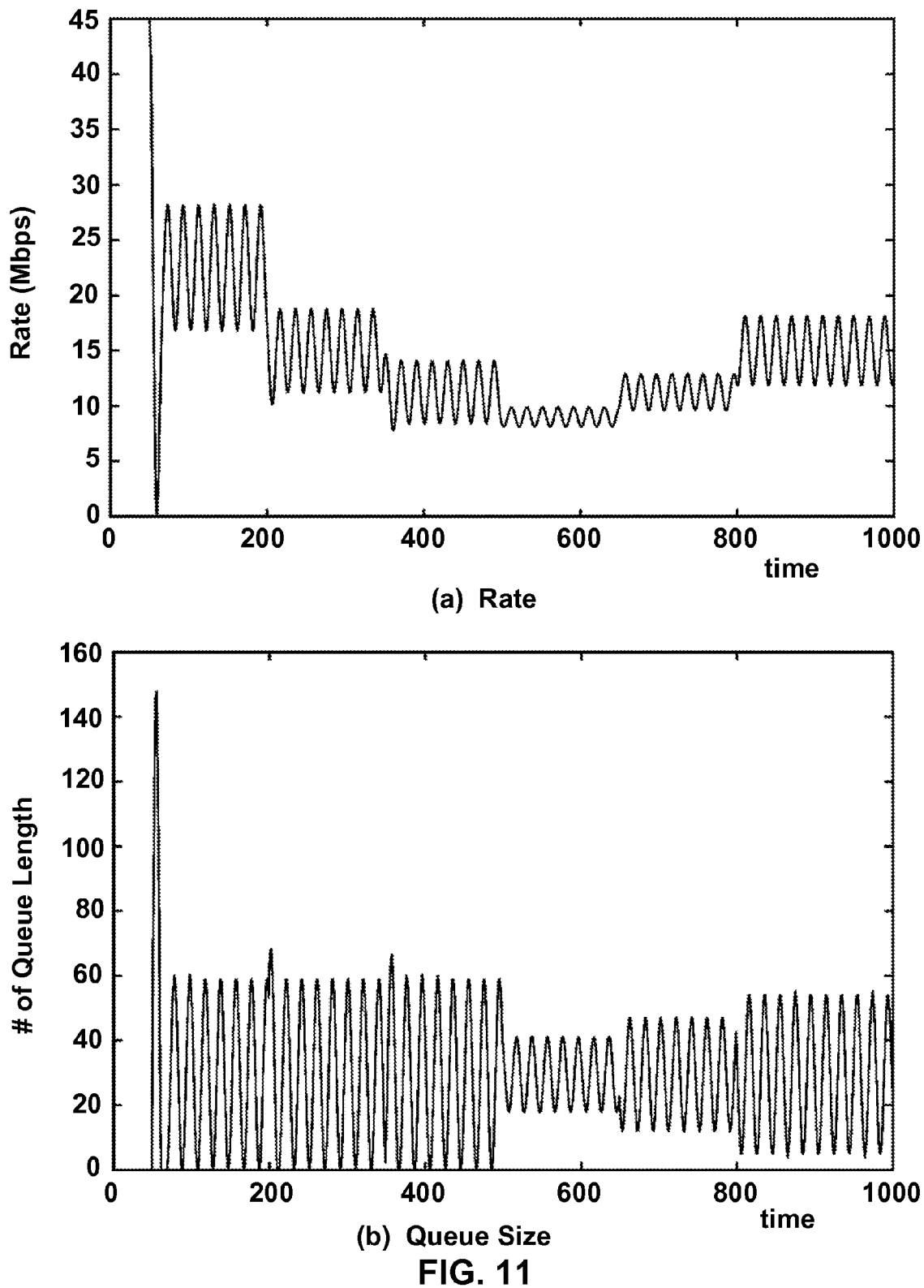
FIG. 11 is a chart describing the performance of a flow controller.
Figure 12:
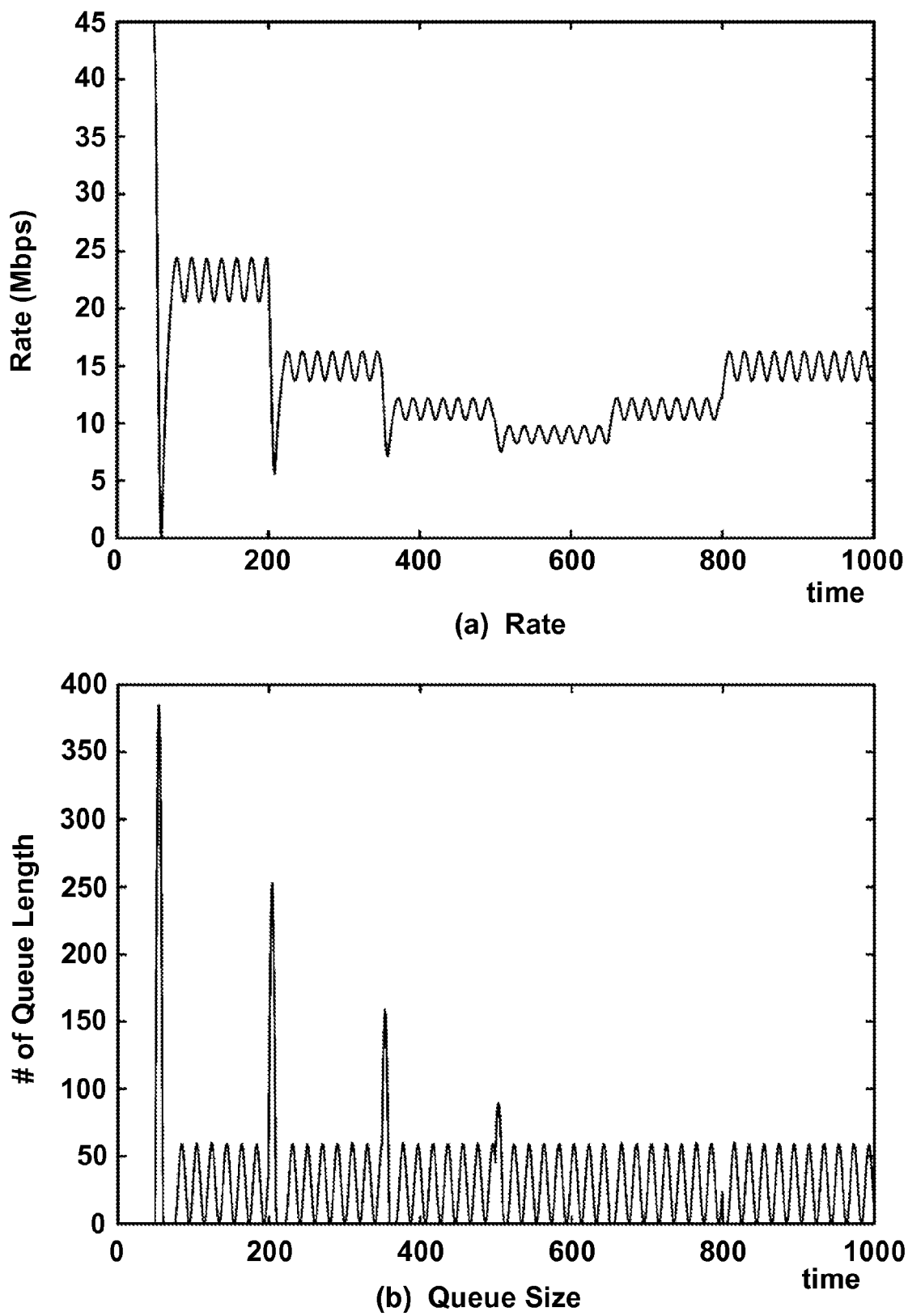
FIG. 12 is a chart describing the performance of a flow controller.

The performance of the Mascolo and Cavendish controller is illustrated in FIGS. 11 and 12, for small and large RTT respectively. Both small RTT and large RTT cases show better performance than the Benmohamed controller. In the small RTT case, the queue occupancy shows high in the first transient period, but better convergency in the middle of simulation time. In the large RTT situation, the controller shows large queue occupancy in every transient period because it slowly responds to queue length changes compared with the small RTT case. However, it does not make the queue length converge to the target length.

Figure 13:
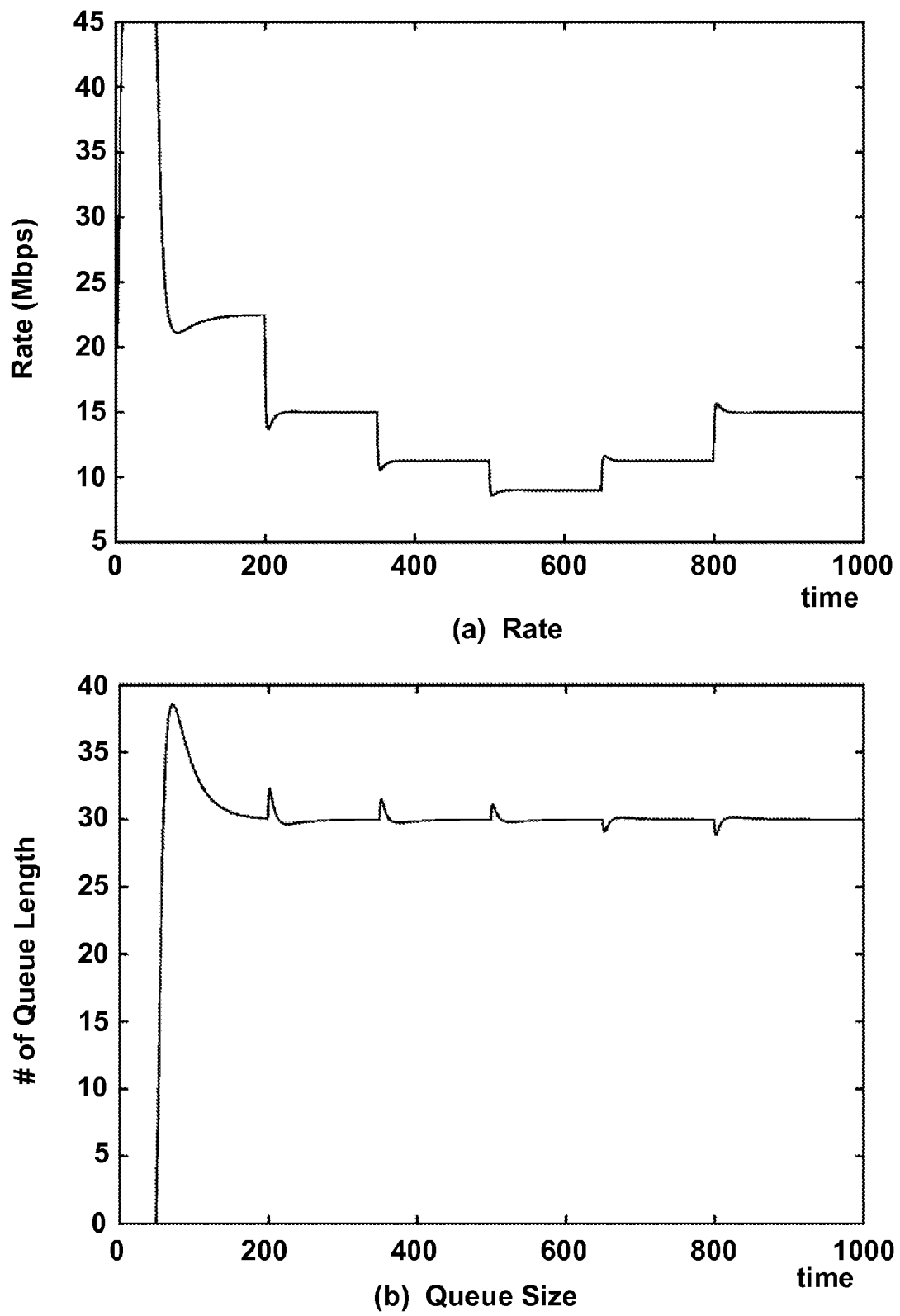
FIG. 13 is a chart describing the performance of a flow controller as per an aspect of an embodiment of the present invention.
Figure 14:
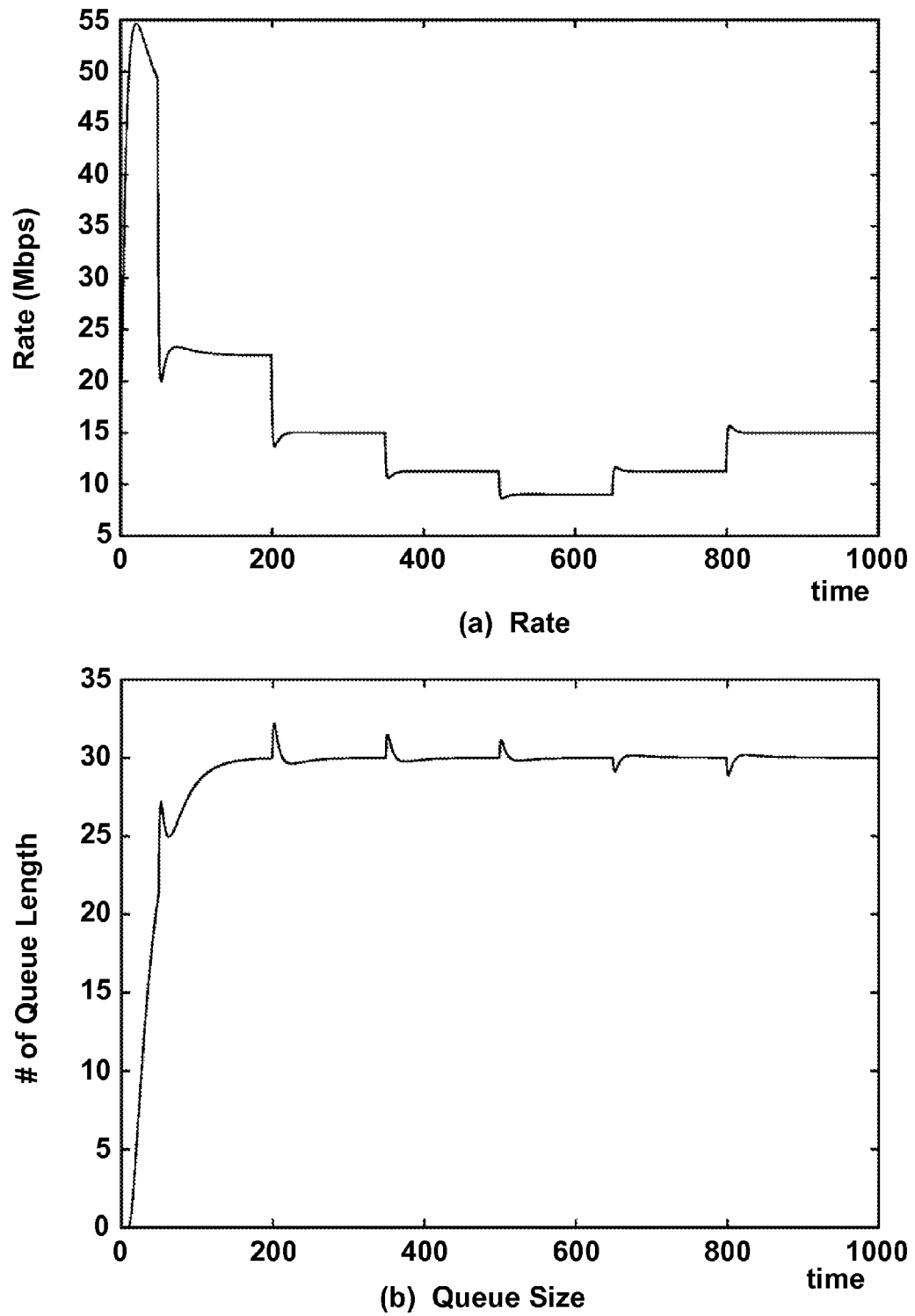
FIG. 14 is a chart describing the performance of a flow controller as per an aspect of an embodiment of the present invention.

Flow controller 600, according to an aspect of the present invention, in the small RTT case, as illustrated by FIG. 13, demonstrates better performance than the Benmohamed controller and the Mascolo and Cavendish controller. Flow controller 600 may respond to changes of queue length quickly and accurately in both the transient period and steady-state. During transient period, flow controller 600 responds to the change of queue quickly by adjusting the sending rate. For the first transient period, the controller does not have enough information on changing queue lengths and rates so that it shows a slightly higher queue length (i.e., 38 packets) compared with the latter transient period. However, it shows far more desirable changes of queue length during the first transient period when compared with the other controllers. The next transient periods show less than 33 packets in queue, which is a very stable queue length change, when compared with the other controllers. In addition, the queue length is matched to the target queue length in steady-state, which the other controllers cannot accomplish.

In the large RTT case, queue length changes slowly in the first transient period compared with the small RTT case. The main difference between the two cases resides until the second flow is generated. In the small RTT case, queue length is maintained around 0 until the second flow is generated, but in the long RTT case, the queue is filled up right after the first flow is generated. The two cases have slightly different rates due to the differences in RTT. However, from the second transient period forward, queue length and rate show almost the same changes as in the small RTT case. The queue length then converges on the target length in steady-state.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on routers that incorporate a flow controller. However, one skilled in the art will recognize that embodiments of the invention could be implemented in any of the hardware and/or software forms described above. Furthermore, the routing functionality could be implemented in a single system or as part of a distributed system.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

In this specification, "a" and "an" and similar phrases are to be interpreted as "at least one" and "one or more."

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A packet router comprising:
   a) an input port configured to:
      i) receive one or more incoming data flows; and
      ii) calculate an incoming flow rate for at least one of the one or more incoming data flows;
   b) a queue configured to buffer the one or more incoming data flows, the queue having a queue length;
   c) an output port configured to output an outgoing data flow, the outgoing data flow being a combination of the at least one of the one or more incoming data flows; and
   d) a flow controller communicatively coupled to the input port, the queue, and the output port, the flow controller configured to calculate a local flow rate, the flow controller further comprising:
      i) a Smith predictor configured to compensate for delays in at least one of the one or more incoming data flows;
      ii) a proportional-integral controller configured to adjust rate coverage to within an approximate desired rate;
      iii) a proportional-derivative controller configured to reject disturbances in at least one of the one or more incoming data flows; and
      iv) a proportional controller configured to, in combination with the proportional-derivative controller, reduce at least one transient period of at least one of the one or more incoming data flows and to stabilize the flow controller.

2. The packet router of claim 1, wherein:
   a) the Smith predictor generates a measured outgoing flow value and a modeled outgoing flow value; and
   b) the output of the Smith predictor is subtracted from the sum of the incoming flow rate and the queue length divided by an outgoing link rate, from which the modeled outgoing flow value is subtracted, and then provided as an input to the proportional-integral controller.

3. The packet router of claim 2, wherein the proportional controller receives the modeled outgoing flow value as an input.

4. The packet router of claim 3, wherein the proportional-derivative controller receives the output of the Smith predictor as an input.

5. The packet router of claim 4, wherein the output of the proportional controller is subtracted from the output of the proportional-integral controller, from which the output of the proportional-derivative controller is subtracted.

6. The packet router of claim 5, wherein the difference between the output of the proportional controller which is subtracted from the output of the proportional-integral controller, and the output of the proportional-derivative controller is provided as an input to the Smith predictor.

7. The packet router of claim 1, wherein the queue is capable of inserting the local flow rate as data into at least one packet of the one or more incoming data flows.

8. The packet router of claim 7, wherein the queue inserts the local flow rate as data within the at least one packet according to a rate-based signaling protocol.

9. The packet router of claim 6, wherein the queue is capable of inserting the local flow rate as data into at least one packet of the one or more incoming data flows.

10. The packet router of claim 8, wherein the rate-based signaling protocol is a TIA-1039 signaling protocol.

11. The packet router of claim 1, wherein the queue is capable of modifying at least one packet of the one or more incoming data flows that includes local flow rate data:
   a) wherein the local flow rate data is not modified if the local flow rate is larger than or equal to the local flow rate data; and,
   b) wherein the local flow rate data is modified to be equal to the local flow rate when the local flow rate is less than the local flow rate data.

12. The packet router of claim 11, wherein the queue modifies the local flow rate data according to a rate-based signaling protocol.

13. The packet router of claim 6, wherein the queue is capable of modifying at least one packet of the one or more incoming data flows that includes local flow rate data:
   a) wherein the local flow rate data is not modified if the local flow rate is larger than or equal to the local flow rate data; and,
   b) wherein the local flow rate data is modified to be equal to the local flow rate when the local flow rate is less than the local flow rate data.

14. The packet router of claim 13, wherein the queue modifies the local flow rate data according to a rate-based signaling protocol.

15. A non-transient computer-readable media containing instructions for making a computer perform a method of routing packets tangibly stored thereon, the method comprising:
   a) determining an outgoing link rate for an output port;
   b) receiving one or more incoming data flows via an input port;
   c) monitoring the input port to determine the rate of incoming packets;
   d) storing the incoming packets from said one or more incoming data flows in a buffer;
   e) monitoring the number of packets in the buffer to determine a queue length relative to a target queue length; and
   f) generating a local flow rate via a flow controller based upon:
      i) the outgoing data link rate of an output port;
      ii) the rate of incoming packets of at least one of said one or more incoming data flows; and
      iii) the queue length relative to the target queue length;
   g) compensating for delays in at least one of the one or more incoming data flow via a Smith predictor; and
   h) reducing at least one transient period of at least one or more incoming data flows and stabilizing the flow controller via a proportional controller in combination with a proportional-derivative controller.

16. The non-transient computer-readable media of claim 15, further comprising:
   a) adjusting rate coverage to within an approximate desired rate via the proportional-integral controller; and
   b) rejecting disturbances in at least one of the one or more incoming data flows via the proportional-derivative controller.

17. The non-transient computer-readable media of claim 16, further comprising inserting the local flow rate into at least one packet of the one or more incoming data flows.

18. The non-transient computer-readable media of claim 17, wherein the local rate is inserted as data within the at least one packet according to a rate-based signaling protocol.

19. The non-transient computer-readable media of claim 16, further comprising modifying at least one packet of the one or more incoming data flows that includes local flow rate data:
   a) wherein the local flow rate data is not modified if the local flow rate is larger than or equal to the local flow rate data; and,
   b) wherein the local flow rate data is modified to be equal to the local flow rate when the local flow rate is less than the local flow rate data.

20. The non-transient computer-readable media of claim 19, wherein the local flow rate data is modified according to a rate-based signaling protocol.

* * * * *